(12) United States Patent
Abuelsaad et al.

(10) Patent No.: US 8,776,048 B2
(45) Date of Patent: Jul. 8, 2014

(54) EARLY CONFIGURATION IN DEPLOYING AN ENTERPRISE APPLICATION

(75) Inventors: Kelly Abuelsaad, Poughkeepsie, NY (US); Kulvir Singh Bhogal, Austin, TX (US); Lisa Seacat DeLuca, San Francisco, CA (US); Soobaek Jang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 13/477,398

(22) Filed: May 22, 2012

(65) Prior Publication Data

US 2013/0318520 A1    Nov. 28, 2013

(51) Int. Cl.
G06F 9/445    (2006.01)
G06F 9/44    (2006.01)

(52) U.S. Cl.
USPC ............................. 717/177; 717/172; 717/174

(58) Field of Classification Search
None
See application file for complete search history.

(56) References Cited

U.S. PATENT DOCUMENTS

| | | | |
|---|---|---|---|
| 6,854,016 B1 * | 2/2005 | Kraenzel et al. | 717/177 |
| 7,043,407 B2 * | 5/2006 | Lynch et al. | 717/174 |
| 7,506,338 B2 * | 3/2009 | Alpern et al. | 717/177 |
| 7,565,650 B2 * | 7/2009 | Bhogal | 717/172 |
| 7,685,412 B1 * | 3/2010 | Burdick et al. | 717/174 |
| 7,761,613 B2 * | 7/2010 | Chen et al. | 717/177 |
| 7,779,404 B2 * | 8/2010 | Movassaghi et al. | 717/174 |
| 7,831,959 B1 * | 11/2010 | Perry et al. | 717/174 |
| 7,895,591 B2 | 2/2011 | Spears | |
| 7,945,707 B2 * | 5/2011 | Chen et al. | 717/177 |
| 8,108,851 B2 * | 1/2012 | Hoover et al. | 717/177 |
| 8,209,680 B1 * | 6/2012 | Le et al. | 717/174 |
| 8,458,717 B1 * | 6/2013 | Keagy et al. | 718/104 |
| 2005/0289536 A1 * | 12/2005 | Nayak et al. | 717/174 |
| 2005/0289538 A1 * | 12/2005 | Black-Ziegelbein et al. | 717/177 |
| 2006/0101462 A1 | 5/2006 | Spears | |
| 2008/0072219 A1 | 3/2008 | Kabadiyski | |
| 2009/0006588 A1 * | 1/2009 | Schmidt et al. | 709/220 |
| 2009/0083728 A1 | 3/2009 | Dennis et al. | |
| 2010/0281458 A1 | 11/2010 | Paladino et al. | |
| 2010/0287075 A1 * | 11/2010 | Herzog et al. | 705/30 |
| 2011/0265077 A1 | 10/2011 | Collison et al. | |
| 2011/0277027 A1 * | 11/2011 | Hayton et al. | 715/738 |
| 2012/0151443 A1 * | 6/2012 | Rohde et al. | 717/121 |
| 2013/0247022 A1 * | 9/2013 | DeJana et al. | 717/172 |

OTHER PUBLICATIONS

Boettner et al., "Towards Policy Driven Self-Configuration of User-Centric Communication", 2009 ACM, ACMSE'09, Mar. 19-21, 2009, Clemson, SC, USA, pp. 1-6; <http://dl.acm.org/citation.cfm?id=1566445.1566493...CFID=412926825&CFTOKEN=18043309>.*

(Continued)

*Primary Examiner* — Thuy Dao
*Assistant Examiner* — Ben C Wang
(74) *Attorney, Agent, or Firm* — Garg Law Firm, PLLC; Rakesh Garg; Mark C. Vallone

(57) ABSTRACT

Illustrative embodiments include a method, system, and computer program product for early configuration of an application in a deployment of an enterprise application. A section is located in an enterprise application deployment file of the enterprise application. The section includes configuration information of the application. The configuration information of the application is loaded before completing loading of the enterprise application deployment file such that the application is configurable without waiting for the loading of the enterprise application deployment file to complete. Loading the enterprise application deployment file is continued without waiting for a configuring of the application using the configuration information of the application that is loaded.

19 Claims, 7 Drawing Sheets

(56) References Cited

OTHER PUBLICATIONS

Agreiter et al., "Model-Driven Configuration of SELinux Policies", Springer-Verlag Berlin Heidelberg 2009, OTM 2009, Part II, LNCS 5871, pp. 887-904; <http://link.springer.com/chapter/10.1007%2F978-3-642-05151-7_10>.*

Aime et al., "Policy-Driven System Configuration for Dependability", 2008 IEEE, pp. 420-425; <http://ieeexplore.ieee.org/stamp/stamp.jsp?tp=&arnumber=4622616>.*

IBM; An XML-configured utility for deploying archive files to a file system, Jun. 29, 2008.

* cited by examiner

US 8,776,048 B2

EARLY CONFIGURATION IN DEPLOYING AN ENTERPRISE APPLICATION

TECHNICAL FIELD

The present invention relates generally to a method, system, and computer program product for configuring applications. Particularly, the present invention relates to a method, system, and computer program product for early configuration in deploying an enterprise application.

BACKGROUND

An enterprise application (EA) is a large-scale software application or software platform that includes other applications, typically to provide a collection of business functions or operations in a logically unified manner. An enterprise application includes infrastructure needed for integrating the various included applications, and for operating in conjunctions with other enterprise applications.

A data processing environment deploys an enterprise application by deploying the enterprise application infrastructure and the included applications. Deployment of an application, whether of the enterprise application infrastructure or of an application included in the enterprise application, includes configuring the application so that the application can access the resources that the application needs to execute in the data processing environment. As an example, an application may require access to a web-service located elsewhere in the data processing environment to be able to execute in the data processing environment to provide the function implemented in the application. During deployment, such as by using a deployment engine, an administrator or a system must configure the application to identify a location, a method of access, policies, and parameters for establishing access to that web-service.

As another example, an application may have to associate or bind with a data repository, a library, an object, a file, or another application, to be able to operate in a data processing environment. For example, relative to a repository, during deployment, the application must be configured to select the repository or its instance, authenticate to the repository, and establish a protocol of interactions with the repository. As another example, for binding with an object instance of a class, among other things, the application must be configured to identify an existing object or instantiate a new object when needed.

SUMMARY

The illustrative embodiments provide a method, system, and computer program product for early configuration in deploying an enterprise application. In at least one embodiment, a method for early configuration in a deployment of an enterprise application is provided. The method includes a computer locating a section in an enterprise application deployment file of the enterprise application. The section includes configuration information of the application. The method further includes the computer loading the configuration information of the application before completing loading of the enterprise application deployment file such that the application is configurable without waiting for the loading of the enterprise application deployment file to complete. The method further includes the computer continuing to load the enterprise application deployment file without waiting for a configuring of the application using the configuration information of the application that is loaded.

In at least one embodiment, another method for enabling early configuration of an application in a deployment of an enterprise application is provided. The method includes a computer receiving a description of a set of applications to be deployed with the enterprise application. The description is for inclusion in an enterprise application deployment file. The enterprise application deployment file is for deploying the enterprise application. The application is a member of the set of applications. The method further includes the computer selecting configuration information corresponding to the application. The method further includes the computer placing the configuration information corresponding to the application in a designated location in the enterprise application deployment file. The configuration information is for loading without waiting for loading of the enterprise application deployment file to complete. The method further includes the computer placing a deployment file corresponding to the application in the enterprise application deployment file such that the deployment file corresponding to the application is usable after the loading of the enterprise application deployment file is complete.

In at least one embodiment, a computer program product for early configuration of an application in a deployment of an enterprise application is provided. The computer program product includes one or more computer-readable tangible storage devices. The computer program product further includes program instructions, stored on at least one of the one or more storage devices, to locate a section in an enterprise application deployment file of the enterprise application. The section includes configuration information of the application. The computer program product further includes program instructions, stored on at least one of the one or more storage devices, to load the configuration information of the application before completing loading of the enterprise application deployment file such that the application is configurable without waiting for the loading of the enterprise application deployment file to complete. The computer program product further includes program instructions, stored on at least one of the one or more storage devices, to continue to load the enterprise application deployment file without waiting for a configuring of the application using the configuration information of the application that is loaded.

In at least one embodiment, a computer system for enabling early configuration of an application in a deployment of an enterprise application is provided. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to receive a description of a set of applications to be deployed with the enterprise application. The description is for inclusion in an enterprise application deployment file. The enterprise application deployment file is for deploying the enterprise application. The application is a member of the set of applications. The computer system further includes program instructions, stored on at least one of the one or more storage devices for execution by at least one of the one or more processors via at least one of the one or more memories, to select configuration information corresponding to the application. The computer system further includes program instructions, stored on at least one of the one or more storage devices for execution by at least one of the one or more processors via at least one of the one or more memories, to place the configuration information corresponding to the application in a designated location in the enterprise application deployment file for loading without waiting for loading of the enterprise application deployment file to complete. The computer system further includes program instructions, stored on at least one of the one or more storage devices for execution by at least one of the one or more processors via at least one of the one or more memories, to place a deployment file corresponding to the application in the enterprise application deployment file such that the deployment file corresponding to the application is usable after the loading of the enterprise application deployment file is complete.

In at least one embodiment, a process for supporting computing infrastructure is provided. The process includes a first computer system providing at least one support service for at least one of creating, integrating, hosting, maintaining, and deploying computer-readable code in a second computer system. The computer-readable code contains instructions. The instructions, when carried out by a processor of the second computer system, implement a method for early configuration of an application in a deployment of an enterprise application. The method includes the second computer system locating a section in an enterprise application deployment file of the enterprise application. The section includes configuration information of the application. The method further includes the second computer system loading the configuration information of the application before completing loading of the enterprise application deployment file such that the application is configurable without waiting for the loading of the enterprise application deployment file to complete. The method further includes the second computer system continuing to load the enterprise application deployment file without waiting for a configuring of the application using the configuration information of the application that is loaded.

BRIEF DESCRIPTION OF THE SEVERAL VIEWS OF THE DRAWINGS

The novel features believed characteristic of the invention are set forth in the appended claims. The invention itself, however, including a preferred mode of use, further objectives and advantages thereof, will best be understood by reference to the following detailed description of illustrative embodiments when read in conjunction with the accompanying drawings, wherein:

DETAILED DESCRIPTION

Figure 1:
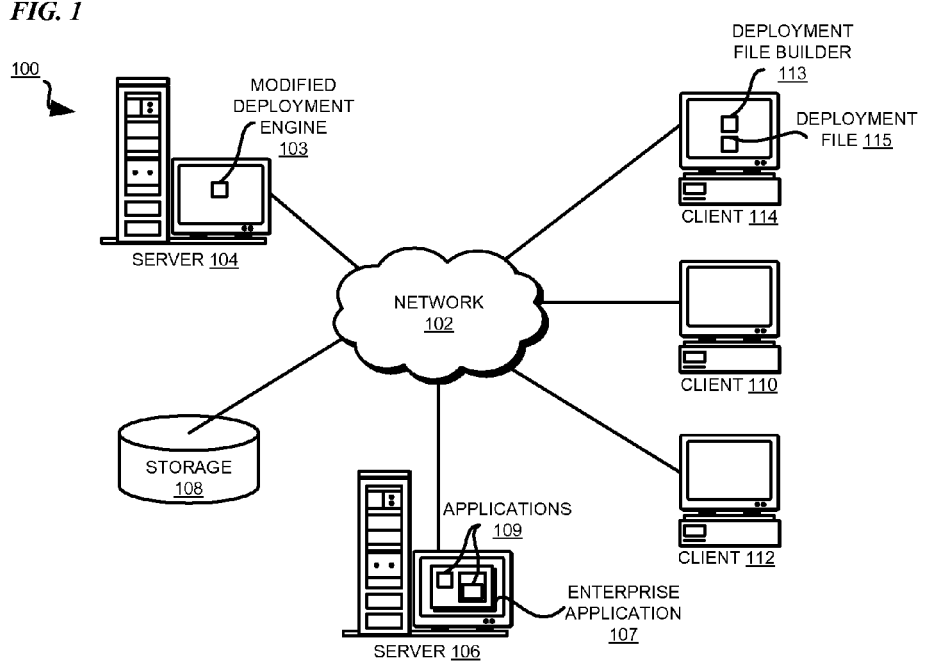
FIG. 1 depicts a pictorial representation of a network of data processing systems in which illustrative embodiments may be implemented.

An average enterprise application can be a complex software product, including hundreds of applications or application components (collectively, "applications"), each of which has to be configured and deployed for the enterprise application to be successfully deployed in a data processing environment. Many applications require user input, input from a system, or a combination thereof, during configuration.

A deployment file is a data structure that holds the information necessary for deploying an enterprise application or an application within an enterprise application. For example, in the case of a Java-based application or a Java™-based enterprise application, a Java Archive (JAR) file, an Enterprise Archive (EAR) file, or a Web Archive (WAR) file acts as a deployment file and holds the deployment information (Java and all Java-based trademarks and logos are trademarks or registered trademarks of Oracle Corporation and/or its affiliates). The deployment file of an application, including the deployment file of an enterprise application, includes code and data of the application as well as configuration information, which is usable for either configuring the application or for soliciting the pertinent configuration information from a user or a system during the deployment of the application.

The illustrative embodiments recognize that a presently used enterprise application deployment process is a serialized process of deploying the enterprise application components and the included applications. For example, presently, a deployment file of an enterprise application has to be loaded into the target data processing system. Once loaded, the configuration of the included applications can begin as they appear in the enterprise application deployment file.

The illustrative embodiments further recognize that loading an enterprise application deployment file is a time consuming activity that often precludes a user from taking further actions with respect to the enterprise application being deployed. For example, when the deployment of an enterprise application begins, an administrator has to begin loading the enterprise application deployment file, and wait for a substantial amount of time for the loading to complete during which time the data processing system is busy and unusable for further configuration of the enterprise application or the included applications. Once the loading is completed, the data processing system prompts the administrator for information needed for configuring one or more of the enterprise application components and included applications.

The illustrative embodiments further recognize that the wait times in the presently available deployment processes often cause administrators and systems to multitask, which can result in the deployment process timing out and requiring a restart. For example, an administrator presently starts an enterprise application deployment, and begins to perform other duties while the deployment process works to reach a point where the administrator's input is required. The administrator may forget that the deployment process is executing, or may leave the deployment process waiting for administrator's input beyond a timeout threshold. Presently available deployment processes require a restart of the deployment process upon a timeout. Consequently, the wait cycle begins anew with a restart, causing a waste of administrator time and system resources.

The illustrative embodiments used to describe the invention generally address and solve the above-described problems and other problems related to deploying enterprise applications. The illustrative embodiments provide a method, system, and computer program product for early configuration in deploying an enterprise application.

Generally, an embodiment of the invention provides a technique for modifying an enterprise application deployment in such a way that configuration information that has to be received from users or systems for configuring the enterprise application or applications included therein is requested before the enterprise application deployment file is completely loaded. Such a manner of requesting configuration information for an application, configuring an application, or both, prior to the enterprise application deployment file being fully loaded is called early configuration within the context of the illustrative embodiments.

The illustrative embodiments are described with respect to certain applications and information based thereon only as examples. Such descriptions are not intended to be limiting on the invention. For example, an illustrative embodiment described with respect to a Java-based application (including a Java-based enterprise application), a Java-based archives such as JAR, EAR, and WAR, or a Java-based enterprise application deployment file or process, can be implemented with similarly purposed data for deploying another type of enterprise application or application within the scope of the illustrative embodiments.

Furthermore, the illustrative embodiments may be implemented with respect to any type of data, data source, or access to a data source over a data network. Any type of data application or storage device may provide the data, such as data for deploying or configuring an application, to an embodiment of the invention, either locally at a data processing system or over a data network, within the scope of the invention.

The illustrative embodiments are further described with respect to certain applications only as examples. Such descriptions are not intended to be limiting on the invention.

An embodiment of the invention may be implemented with respect to any type of application, such as, for example, applications that are served, the instances of any type of server application, a platform application, a stand-alone application, an administration application, or a combination thereof. An application, including an application implementing all or part of an embodiment, may further include data objects, code objects, encapsulated instructions, application fragments, services, and other types of resources available in a data processing environment. For example, a Java object, an Enterprise Java Bean (EJB), a servlet, or an applet may be manifestations of an application with respect to which the invention may be implemented.

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
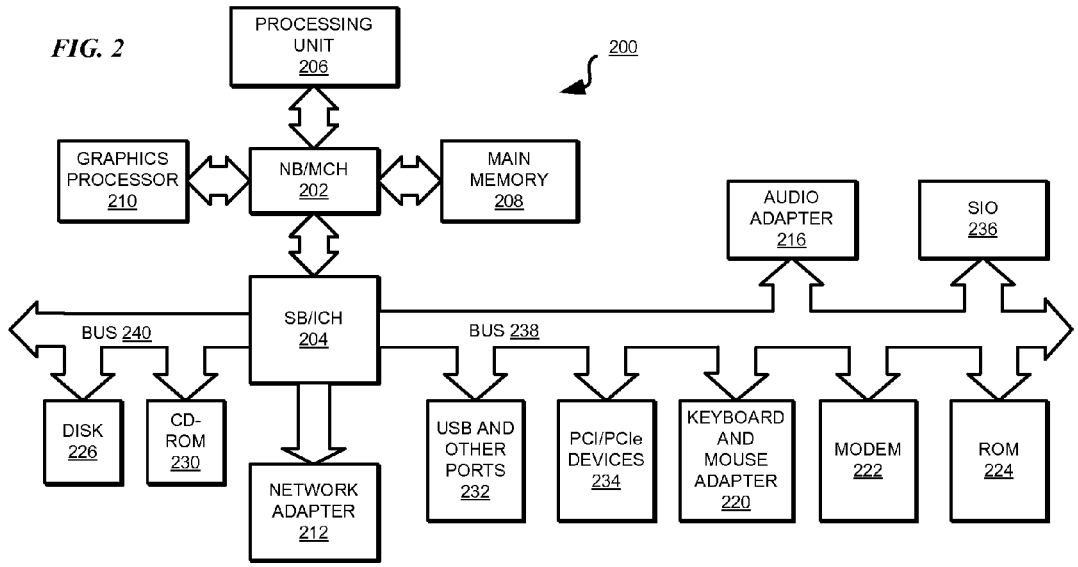
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 106 may include example enterprise application 107 whose deployment can be improved by using an embodiment. As an example, enterprise application 107 further includes applications 109. A data processing system, such as client 114, includes a deployment file builder 113 according to an embodiment. Deployment file builder 113 constructs deployment file 115 for enterprise application 107 according to an embodiment. A modified deployment engine 103, executing in a data processing system, such as in server 104, deploys enterprise application 107 using deployment file 115 in accordance with an embodiment. In one example operation, an embodiment enables early configuration of applications 109 before deployment file 115 for enterprise application 107 is completely loaded.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client/server environment in which the illustrative embodiments may be implemented. A client/server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer or a data processing device, such as server 104, server 106, or client 114 in FIG. 1, in which computer usable program code or instructions implementing the processes for certain illustrative embodiments, such as, for example, the instructions for modified deployment engine 103 in FIG. 1, deployment file builder 113 in FIG. 1, but not limited there to, may be located.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java programming system, may run in conjunction with the operating system and provides calls to the operating system from Java programs or applications executing on data processing system 200.

Instructions for the operating system, the object-oriented programming system, and applications or programs such as deployment file builder 113 in FIG. 1 and modified deployment engine 103 in FIG. 1 are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
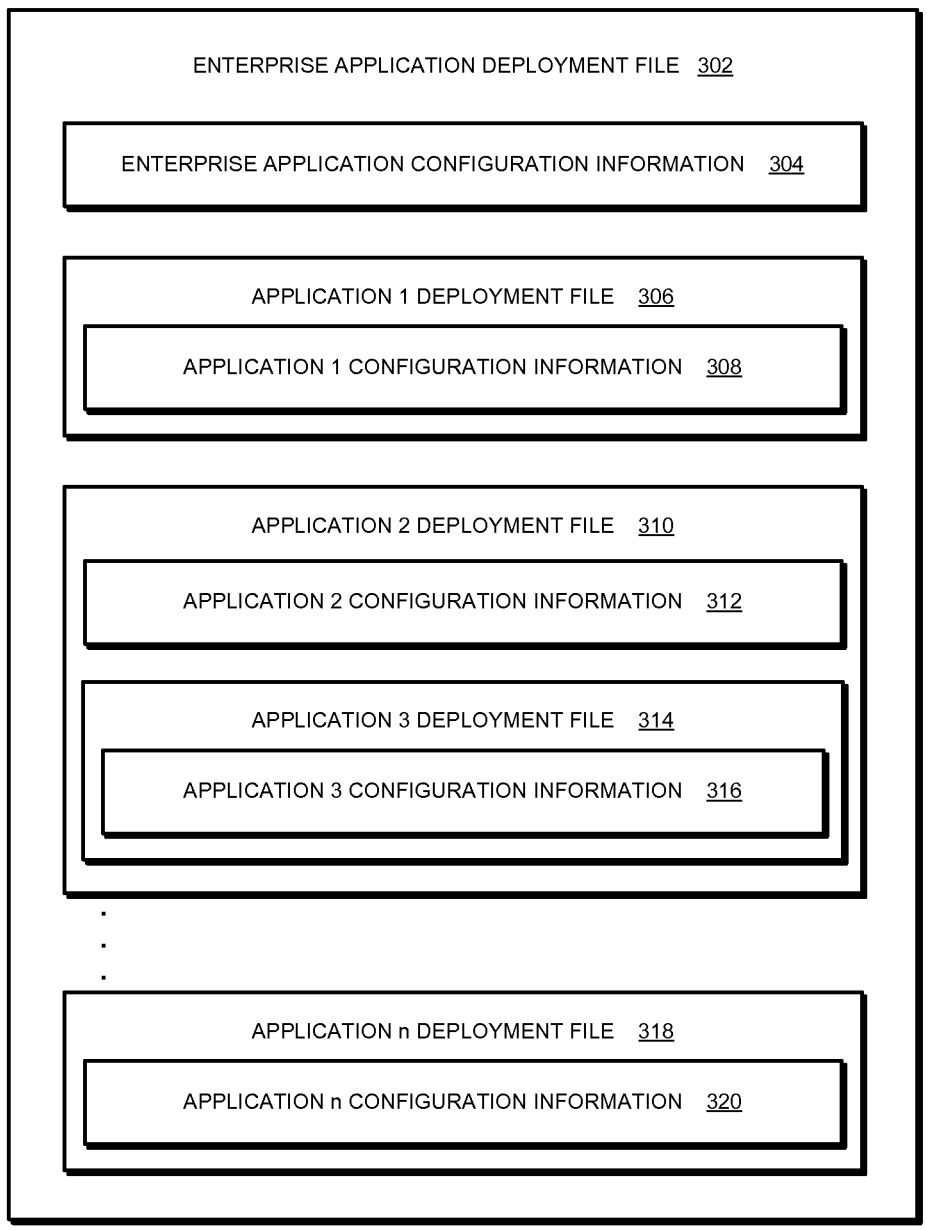
FIG. 3 depicts a block diagram of a generalized enterprise application deployment file that can be modified for early configuration in accordance with an illustrative embodiment.

With reference to FIG. 3, this figure depicts a block diagram of a generalized enterprise application deployment file that can be modified for early configuration in accordance with an illustrative embodiment. Enterprise application deployment file 302 is usable for deploying an enterprise application including applications (such as enterprise application 107 including applications 109 in FIG. 1) on a server (such as server 106 in FIG. 1).

The information contained in enterprise application deployment file 302 can be divided into several parts. Part 304 labeled "enterprise application configuration information" contains information usable for configuring the enterprise application, such as for configuring the infrastructure provided by the enterprise application. Part 304 also contains instructions for receiving certain configuration information from a user or a system for configuring the enterprise application.

Similarly, part 306 is a deployment file for an application—"Application 1"—included in the enterprise application. Part 306 is similar to enterprise application deployment file 302 in structure, purpose, or both. Accordingly, as depicted according to one example embodiment, part 306 includes part 308 labeled "Application 1 configuration information". Part 308 contains information usable for configuring Application 1, instructions for receiving certain configuration information from a user or a system for configuring Application 1, or both.

Similarly, part 310 is a deployment file for another application—"Application 2"—included in the enterprise application. Part 310 is similar to part 304 in structure, purpose, or both. Accordingly, as depicted according to one example embodiment, part 310 includes part 312 labeled "Application 2 configuration information". Part 312 contains information usable for configuring Application 2, instructions for receiving certain configuration information from a user or a system for configuring Application 2, or both.

An application in an enterprise application itself may need another application or component to be deployed and configured. For example, as depicted, Application 3 has to be deployed for Application 2 to be deployed successfully in the enterprise application. Accordingly, as depicted according to one example embodiment, part 314 is a deployment file for Application 3, which includes part 316 labeled "Application 3 configuration information". Part 316 contains information usable for configuring Application 3, instructions for receiving certain configuration information from a user or a system for configuring Application 3, or both.

Enterprise application deployment file 302 can include any number of deployment files and parts thereof for deploying any number of applications when deploying the enterprise application. Part 318 is a deployment file for the n-th application—"Application n"—included in the enterprise application. Part 320 labeled "Application n configuration information" contains information usable for configuring Application n, instructions for receiving certain configuration information from a user or a system for configuring Application n, or both.

In an example implementation, enterprise application deployment file 302 could be a deployment file named "HelloWorld_WEB_EAR.ear". A directory called "META-INF" in HelloWorld_WEB_EAR.ear corresponds to enterprise application configuration information 304 and holds the configuration information for the HelloWorld enterprise application. For example, "application_bind.xml" in "META-INF" in HelloWorld_WEB_EAR.ear could specify a binding for a component of the HelloWorld enterprise application, contain instructions that would prompt an administrator via a pop-up window to enter a path to an object related to a binding, or both.

Part 306 could be "HelloWorld_Admin_WEB.war" that deploys an administration application for the HelloWorld enterprise application. A directory called "WEB-INF" in HelloWorld_Admin_WEB.war corresponds to application configuration information 308 and holds the configuration information for the administration application. For example, "web_ext.xml" in "WEB-INF" in HelloWorld_Admin_WEB.war could specify an extension for the administration application, contain instructions that would prompt an administrator via a pop-up window to specify a parameter of an extension, or both.

Similarly, corresponding to part 310 and application configuration information 312, HelloWorld_WEB_EAR.ear could include "HelloWorld_Audit_JAR.jar" with an xml file in a META-INF directory therein that deploys and configures an auditing application for the HelloWorld enterprise application. A synchronization component may have to be deployed within the auditing application a component. Accordingly, HelloWorld_Audit_JAR.jar could include "HelloWorld_Audit_Sync_JAR.jar" corresponding to part 314. HelloWorld_Audit_Sync_JAR.jar could also include a META-INF directory including a "server-configuration.wsdd" corresponding to application configuration information 316 that specifies certain configuration information for the synchronization component.

Figure 4:
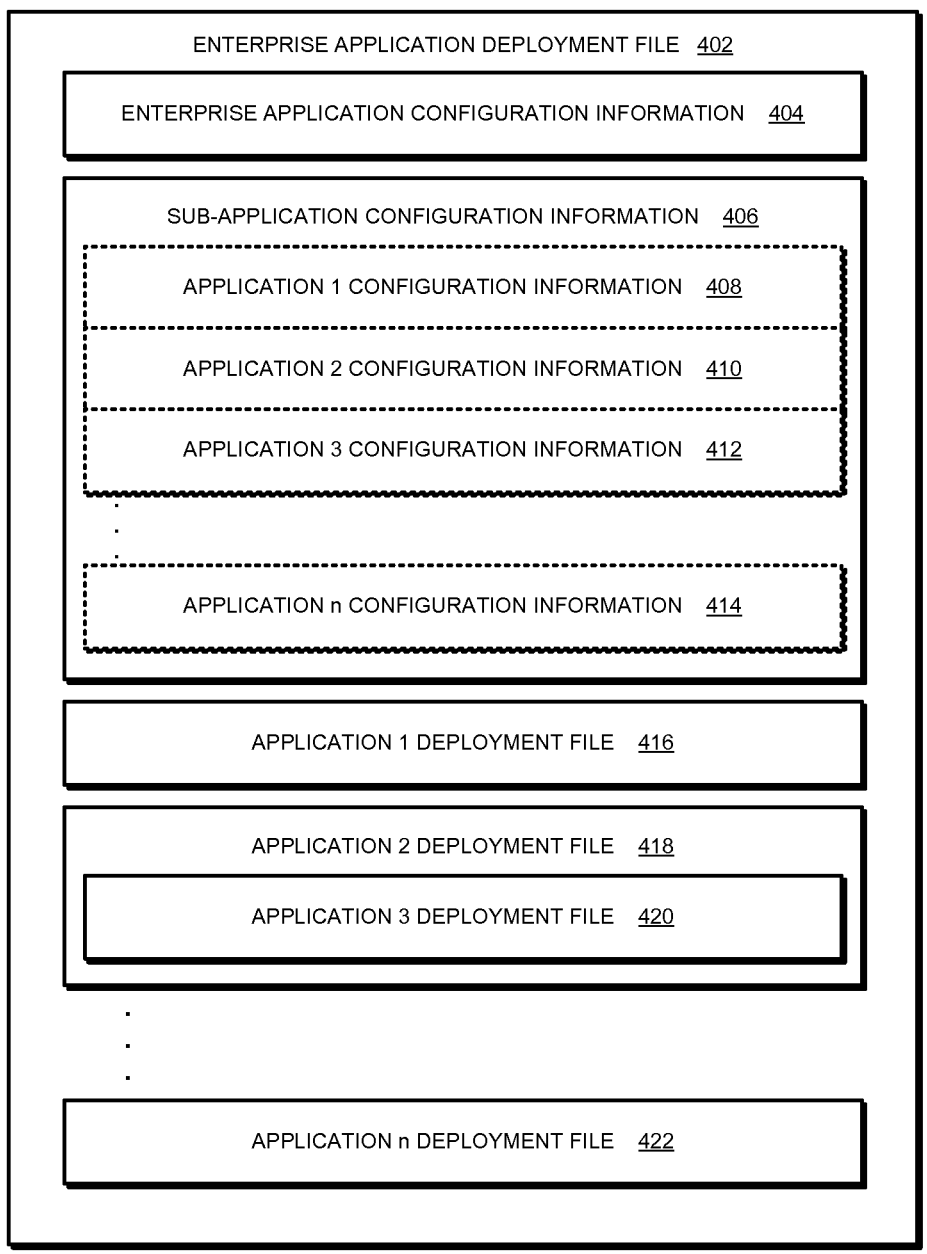
FIG. 4 depicts a block diagram of an improved enterprise application deployment file that enables early configuration in deploying an enterprise application in accordance with an illustrative embodiment.

With reference to FIG. 4, this figure depicts a block diagram of an improved enterprise application deployment file that enables early configuration in deploying an enterprise application in accordance with an illustrative embodiment. Enterprise application deployment file 402 is usable in place of enterprise application deployment file 302 in FIG. 3 for deploying an enterprise application including applications (such as enterprise application 107 including applications 109 in FIG. 1) on a server (such as server 106 in FIG. 1).

The information contained in enterprise application deployment file 402 can be divided into several parts. Part 404 labeled "enterprise application configuration information" is analogous to part 304 in FIG. 3 and contains information usable for configuring the enterprise application, instructions for receiving certain configuration information from a user or a system for configuring the enterprise application, or both.

Part 406 labeled "Sub-application configuration information" is a part added by an embodiment. Part 406 includes parts 408, 410, 412, and 414, which are application configuration information parts corresponding to application configuration information parts 308, 312, 316, and 320, respectively, in FIG. 3. Note that an embodiment can modify application configuration information, such as application configuration information 308 from FIG. 3, before including that application configuration information into part Sub-application configuration information part 406. Alternatively, or in combination with modifying application configuration information, such as application configuration information 312 in FIG. 3, an embodiment can move the application configuration information from an application's deployment file (e.g., Application 2's deployment file 310 in FIG. 3) to Sub-application configuration information part 406. Thus, parts 408, 410, 412, and 414 can be the application configuration information from a prior art application deployment file, or a modified form thereof, depending on the particular implementation.

Parts 416, 418, 420, and 422 correspond to the remainders of application deployment file 306, 310, 314, and 318, respectively, in FIG. 3, once application configuration information parts 308, 312, 316, and 320 of FIG. 3 have been adapted to part 406 in the above described manner. Particularly, parts 416, 418, 420, and 422 retain the deployment information for Applications 1, 2, 3, and n.

The separation of the configuration information and the deployment information for the applications in an enterprise application deployment advantageously allows the configuration information to be obtained earlier in the deployment process, and separate from the deployment of the applications. For example, a modified deployment engine according to an embodiment can recognize an improved enterprise application deployment file, such as enterprise application deployment file 402, and prompt, obtain, solicit, or otherwise prepare the configuration information for the applications in the enterprise application being deployed before an application's deployment information is loaded or the loading of enterprise application deployment file 402 is completed.

Thus, an improved enterprise application deployment file, such as enterprise application deployment file 402, allows configuration information of included applications to be loaded into a target data processing system earlier than when the applications are deployed in the target data processing system, and earlier than when the entire enterprise application deployment file has been loaded in the target data processing system. An improved enterprise application deployment file of an embodiment also facilitates early configuration of applications and an administrator or a system need not wait for the loading of the enterprise application deployment file to complete. The administrator or the system can provide or manipulate the configuration information of the various applications being deployed in conjunction with deployment of the enterprise application as soon as the Sub-application configuration information part of the enterprise application deployment file is loaded, which occurs earlier than the loading of the applications' deployment files. By using an embodiment and avoiding the wait time for configuring the applications, the deployment process is less likely to timeout and require a restart, and an administrator is less likely to forget that the deployment process is executing and may have reached a point where the administrator can manipulate the configuration information.

Figure 5:
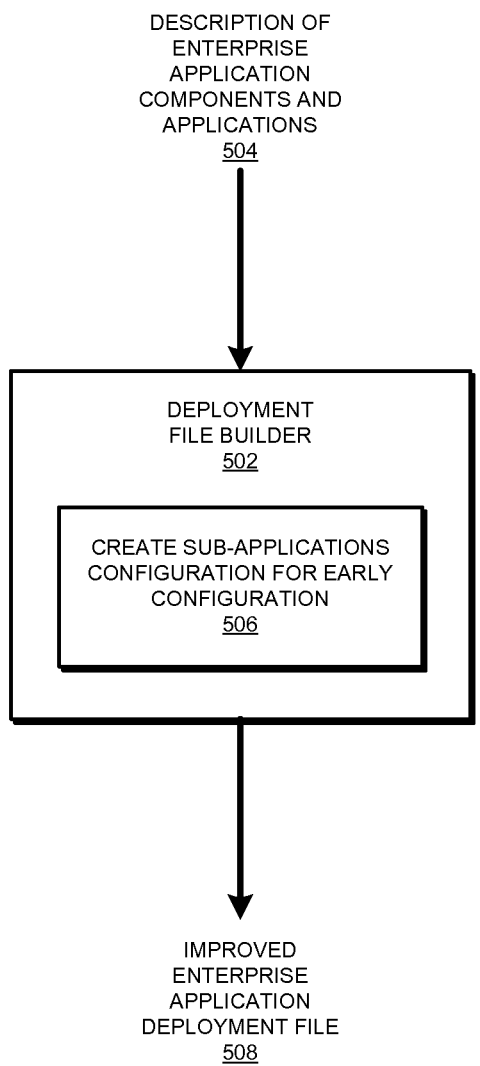
FIG. 5 depicts a block diagram of an example configuration of a modified deployment file builder in accordance with an illustrative embodiment.

With reference to FIG. 5, this figure depicts a block diagram of an example configuration of a modified deployment file builder in accordance with an illustrative embodiment. Deployment file builder 502 is an example of deployment file builder 113 in FIG. 1. Deployment file builder 502 is a modified deployment file builder that can build Sub-application configuration information part 406 and produce improved enterprise application deployment file 402 of FIG. 4.

Deployment file builder 502 accepts description 504 of enterprise application components and applications as input. Description 504 is sufficient to create a deployment file for the enterprise application, create configuration information for the enterprise application components and applications, and create deployment files for the various applications. Description 504 can be generated from existing applications or processes that create an enterprise application package.

Deployment file builder 502 includes component 506 that creates sub-application configuration information for early configuration, such as Sub-application configuration information 406 in FIG. 4. Component 506 identifies the configuration information of various enterprise application components or applications that are to be included in the sub-application configuration information. Component 506 modifies, moves, or modifies and moves, the identified configuration information into a sub-application configuration information part of improved enterprise application deployment file 508. Deployment file builder 502 outputs improved enterprise application deployment file 508 for use by a modified deployment engine.

Figure 6:
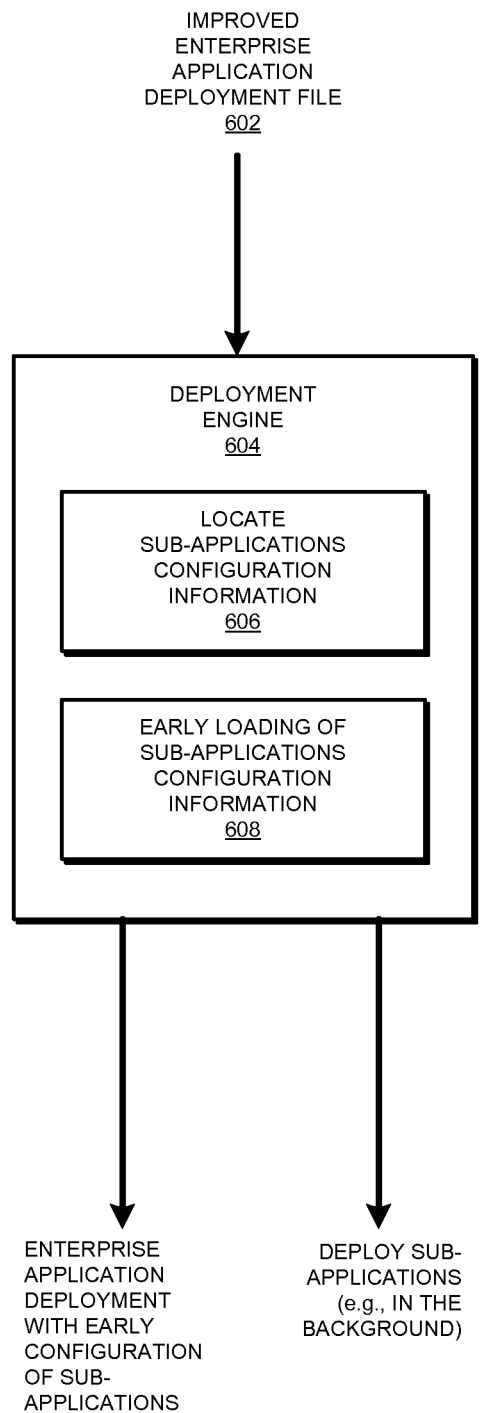
FIG. 6 depicts a block diagram of a modified deployment engine for early loading of configuration information in an enterprise application deployment file and early configuration of the corresponding applications in accordance with an illustrative embodiment.

With reference to FIG. 6, this figure depicts a block diagram of a modified deployment engine for early loading of configuration information in an enterprise application deployment file and early configuration of the corresponding applications in accordance with an illustrative embodiment. Improved enterprise application deployment file 602 is analogous to improved enterprise application deployment file 508 in FIG. 5.

Modified deployment engine 604 is analogous to modified deployment engine 103 in FIG. 1. Modified deployment engine 604 is a modification over an existing deployment engine for including components 606 and 608.

Component 606 locates the sub-application configuration information part in improved enterprise application deployment file 602. Component 608 loads the configuration information from the sub-application configuration information part of improved enterprise application deployment file 602, thus allowing early configuration of the applications. Modified deployment engine 604 continues to load the remainder of improved enterprise application deployment file 602, and deploys the applications as a background process, without waiting for configuration information to be input or manipulated. An administrator or a system can input or manipulate the early loaded configuration information without waiting for modified deployment engine 604 to finish loading improved enterprise application deployment file 602.

Figure 7:
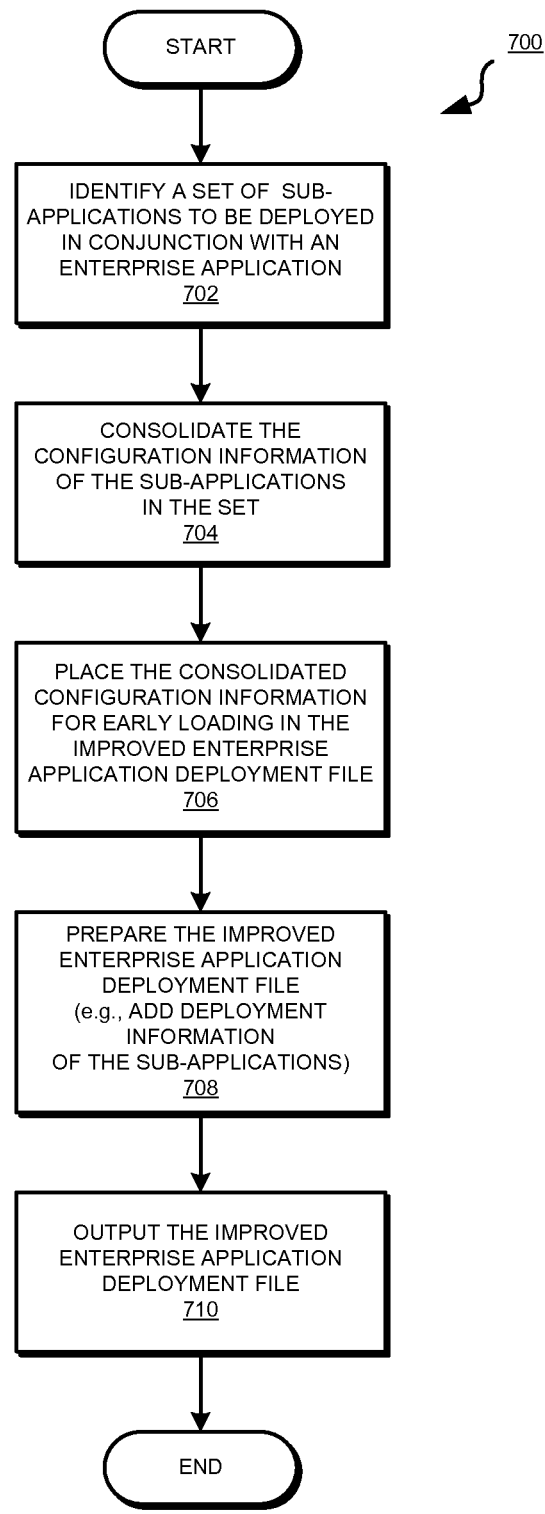
FIG. 7 depicts a flowchart of an example process for creating an improved enterprise application deployment file for early loading of configuration information in accordance with an illustrative embodiment.

With reference to FIG. 7, this figure depicts a flowchart of an example process for creating an improved enterprise application deployment file for early loading of configuration information in accordance with an illustrative embodiment. Process 700 can be implemented in a modified deployment file builder, such as modified deployment file builder 502 in FIG. 5.

The modified deployment file builder identifies a set of applications to be deployed in conjunction with an enterprise application (sub-applications) (block 702). As an example, the modified deployment file builder can identify the applications using description 504 of FIG. 5.

The modified deployment file builder consolidates the configuration information of the sub-applications in the set by either collecting the configuration information provided for a sub-application, modifying the configuration information provided for a sub-application, or both (block 704). The modified deployment file builder places the consolidated configuration information for early loading in an improved enterprise application deployment file, such as enterprise application deployment file 508 in FIG. 5 (block 706).

The modified deployment file builder further prepares the improved enterprise application deployment file, such as by adding deployment information for the sub-applications to the improved enterprise application deployment file (block 708). The modified deployment file builder outputs the improved enterprise application deployment file, for example, to a modified deployment engine (block 710). Process 700 ends thereafter.

Figure 8:
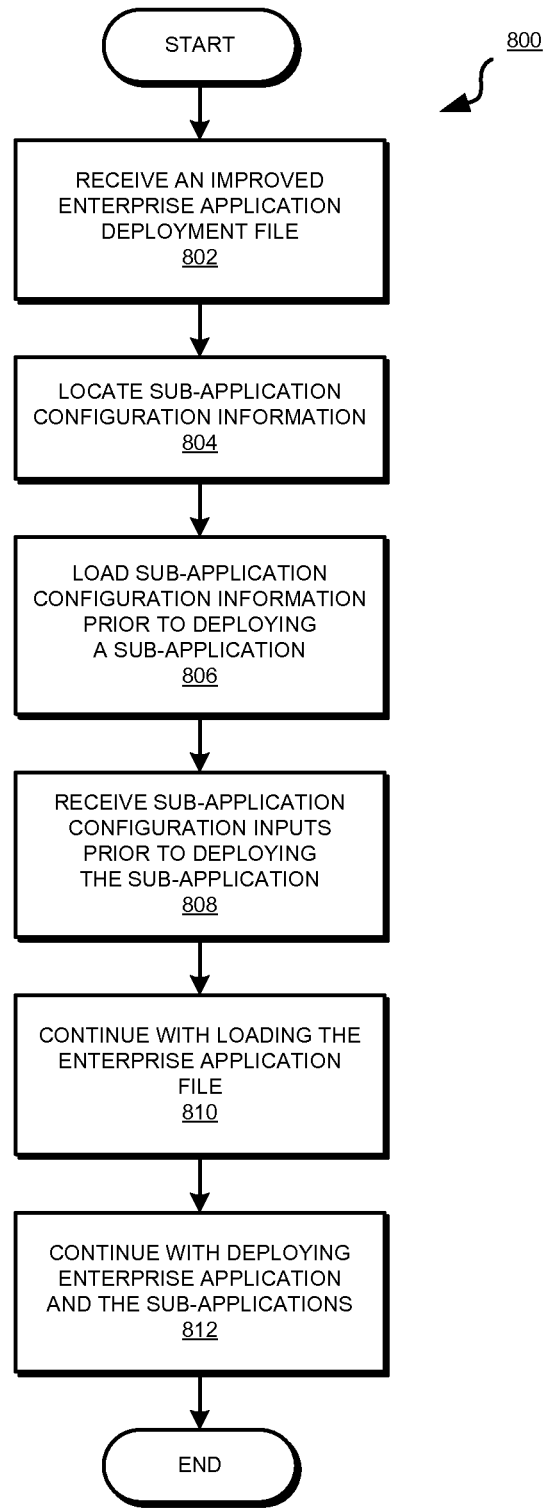
FIG. 8 depicts a flowchart of an example process of early configuration in deploying an enterprise application in accordance with an illustrative embodiment.

With reference to FIG. 8, this figure depicts a flowchart of an example process of early configuration in deploying an enterprise application in accordance with an illustrative embodiment. Process 800 can be implemented in a modified deployment engine, such as modified deployment engine 604 in FIG. 6.

The modified deployment engine receives an improved enterprise application deployment file, such as from a modified deployment file builder implementing process 700 of FIG. 7 (block 802). The modified deployment engine locates a sub-application configuration information part of the improved enterprise application deployment file (block 804). The modified deployment engine loads the sub-application configuration information prior to deploying a sub-application (block 806).

The modified deployment engine receives one or more inputs relative to the early loaded sub-application configuration information, such as to manipulate an aspect of the early loaded sub-application configuration information, prior to deploying a sub-application (block 808). The modified deployment engine continues to load the improved enterprise application deployment file (block 810). The modified deployment engine continues to deploy the enterprise application and the sub-applications thereof (block 812). Process 800 ends thereafter.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for early configuration in deploying an enterprise application. An embodiment allows receiving, entering, checking, or manipulating the configuration information of a sub-application of an enterprise application without having to wait for the enterprise application deployment file to be completely loaded. Using an embodiment, an administrator or a system can configure the enterprise application, the enterprise application components, the enterprise application sub-applications, or a combination thereof before the enterprise application deployment file loading is completed and before a sub-application is deployed.

The illustrative embodiments contemplate an enhancement whereby a user or a system can select the sub-applications or enterprise application components that can be configured early. For example, in an example configuration described with respect to FIGS. 3 and 4, an administrator may select Application 1 to be configured early in this manner, but not Application 2. Accordingly, the configuration information of Application 1 may be consolidated in a sub-application configuration information section of an improved enterprise application deployment file whereas the configuration information of Application 2 may remain with Applicant 2's deployment information. Thus, Application 1's configuration information will be loaded early and Application 1 will be configurable early, but Application 2 will continue to be configured only when the improved enterprise application deployment file is completely loaded and Application 2 is being deployed, as in the prior art.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer readable storage device," and computer-readable storage device" do not encompass a signal propagation medium such as a copper cable, fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or a mobile ad hoc network (MANET), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational blocks to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to early configuration of an application in a deployment of an enterprise application. In another embodiment, the invention provides a method that performs the process steps of the invention on a subscription, advertising and/or fee basis. That is, a service provider, such as a Solution Integrator, can offer to create, maintain, support, etc. a process of early configuration of an application in a deployment of an enterprise application. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, a set includes one or more members unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for early configuration of an application in a deployment of an enterprise application, the method comprising:
    a computer locating a section in an enterprise application deployment file of the enterprise application, the section including configuration information of the application, wherein the application has a corresponding application deployment file, the application deployment file including the configuration information of the application and deployment information of the application such that during a deployment of the application using the application deployment file the configuration information of the application loads after the deployment information of the application has completed loading, wherein the configuration information of the application is moved from the deployment file of the application to the section in the enterprise application deployment file, wherein the deployment information of the application is moved to a second section in the enterprise application deployment file such that during the deployment of the enterprise application the configuration information of the application loads separately from the deployment information of the application and before the deployment information of the application has completed loading;
    the computer loading the configuration information of the application before completing loading of the enterprise application deployment file such that the application is configurable without waiting for the loading of the enterprise application deployment file to complete; and
    the computer continuing to load the enterprise application deployment file without waiting for a configuring of the application using the configuration information of the application that is loaded.

2. The method of claim 1, further comprising:
    the computer receiving the enterprise application deployment file.

3. The method of claim 1, wherein locating the section comprises:
    the computer identifying the section as including a set of configuration information corresponding to a set of applications, the applications in the set of applications forming sub-applications of the enterprise application.

4. The method of claim 1, wherein the section is situated in a designated location in the enterprise application deployment file for loading without waiting for the loading of the enterprise application deployment file to complete.

5. The method of claim 1, wherein loading the configuration information of the application before completing loading of the enterprise application deployment file allows manipulating the configuration information of the application before the application is deployed.

6. A computer program product comprising one or more computer-readable tangible storage devices and computer-readable program instructions which are stored on the one or more storage devices and when executed by one or more processors, perform the method of claim 1.

7. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

8. A method for enabling early configuration of an application in a deployment of an enterprise application, the method comprising:
    a computer receiving a description of a set of applications to be deployed with the enterprise application, the application being a member of the set of applications, wherein the application has a corresponding application deployment file, the application deployment file including configuration information of the application and deployment information of the application such that during a deployment of the application using the application deployment file the configuration information of the application loads after the deployment information of the application has completed loading;
    the computer selecting the configuration information from the application deployment file corresponding to the application;
    the computer moving the configuration information from the deployment file of the application to a section in an enterprise application deployment file for deploying the enterprise application, the configuration information for loading without waiting for loading of the enterprise application deployment file to complete; and the computer moving the deployment information of the application to a second section in the enterprise application deployment file such that during the deployment of the enterprise application the configuration information of the application loads separately from the deployment information of the application and before the deployment information of the application has completed loading.

9. The method of claim 8, further comprising:

the computer modifying the configuration information of the application prior to the moving such that the application is configurable using the modified configuration information before the deployment information of the application is loaded.

10. A computer program product comprising one or more computer-readable tangible storage devices and computer-readable program instructions which are stored on the one or more storage devices and when executed by one or more processors, perform the method of claim 8.

11. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 8.

12. A computer program product for early configuration of an application in a deployment of an enterprise application, the computer program product comprising:

one or more computer-readable tangible storage devices;

program instructions, stored on at least one of the one or more storage devices, to locate a section in an enterprise application deployment file of the enterprise application, the section including configuration information of the application, wherein the application has a corresponding application deployment file, the application deployment file including the configuration information of the application and deployment information of the application such that during a deployment of the application using the application deployment file the configuration information of the application loads after the deployment information of the application has completed loading, wherein the configuration information of the application is moved from the deployment file of the application to the section in the enterprise application deployment file, wherein the deployment information of the application is moved to a second section in the enterprise application deployment file such that during the deployment of the enterprise application the configuration information of the application loads separately from the deployment information of the application and before the deployment information of the application has completed loading;

program instructions, stored on at least one of the one or more storage devices, to load the configuration information of the application before completing loading of the enterprise application deployment file such that the application is configurable without waiting for the loading of the enterprise application deployment file to complete; and program instructions, stored on at least one of the one or more storage devices, to continue to load the enterprise application deployment file without waiting for a configuring of the application using the configuration information of the application that is loaded.

13. The computer program product of claim 12, further comprising:

program instructions, stored on at least one of the one or more storage devices, to receive the enterprise application deployment file.

14. The computer program product of claim 12, wherein the program instructions to locate the section comprise:

program instructions, stored on at least one of the one or more storage devices, to identify the section as including a set of configuration information corresponding to a set of applications, the applications in the set of applications forming sub-applications of the enterprise application.

15. The computer program product of claim 12, wherein the section is situated in a designated location in the enterprise application deployment file for loading without waiting for the loading of the enterprise application deployment file to complete.

16. The computer program product of claim 12, wherein loading the configuration information of the application before completing loading of the enterprise application deployment file allows manipulating the configuration information of the application before the application is deployed.

17. A computer system for enabling early configuration of an application in a deployment of an enterprise application, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to receive a description of a set of applications to be deployed with the enterprise application, the application being a member of the set of applications, wherein the application has a corresponding application deployment file, the application deployment file including configuration information of the application and deployment information of the application such that during a deployment of the application using the application deployment file the configuration information of the application loads after the deployment information of the application has completed loading;

program instructions, stored on at least one of the one or more storage devices for execution by at least one of the one or more processors via at least one of the one or more memories, to select the configuration information from the application deployment file corresponding to the application;

program instructions, stored on at least one of the one or more storage devices for execution by at least one of the one or more processors via at least one of the one or more memories, to move the configuration information from the deployment file of the application to a section in an enterprise application deployment file for deploying the enterprise application, the configuration information for loading without waiting for loading of the enterprise application deployment file to complete; and program instructions, stored on at least one of the one or more storage devices for execution by at least one of the one or more processors via at least one of the one or more memories, to move the deployment information of the application to a second section in the enterprise application deployment file such that during the deployment of the enterprise application the configuration information of the application loads separately from the deployment information of the application and before the deployment information of the application has completed loading.

18. The computer system of claim 17, further comprising:
program instructions, stored on at least one of the one or more storage devices for execution by at least one of the one or more processors via at least one of the one or more memories, to modify the configuration information of the application prior to moving the configuration information of the application, such that the application is configurable using the modified configuration information before the deployment information of the application is loaded.

19. A process for supporting computing infrastructure, the process comprising:
a first computer system providing at least one support service for at least one of creating, integrating, hosting, maintaining, and deploying computer-readable code in a second computer system, the computer-readable code containing instructions, wherein the instructions, when carried out by a processor of the second computer system, implement a method for early configuration of an application in a deployment of an enterprise application, the method comprising:
the second computer system locating a section in an enterprise application deployment file of the enterprise application, the section including configuration information of the application, wherein the application has a corresponding application deployment file, the application deployment file including the configuration information of the application and deployment information of the application such that during a deployment of the application using the application deployment file the configuration information of the application loads after the deployment information of the application has completed loading, wherein the configuration information of the application is moved from the deployment file of the application to the section in the enterprise application deployment file, wherein the deployment information of the application is moved to a second section in the enterprise application deployment file such that during the deployment of the enterprise application the configuration information of the application loads separately from the deployment information of the application and before the deployment information of the application has completed loading;
the second computer system loading the configuration information of the application before completing loading of the enterprise application deployment file such that the application is configurable without waiting for the loading of the enterprise application deployment file to complete; and
the second computer system continuing to load the enterprise application deployment file without waiting for a configuring of the application using the configuration information of the application that is loaded.

* * * * *